United States Patent
Akhtar et al.

(10) Patent No.: US 12,356,224 B2
(45) Date of Patent: Jul. 8, 2025

(54) ACCESS POINT CHANNEL SELECTION

(71) Applicant: Arista Networks, Inc., Santa Clara, CA (US)

(72) Inventors: Nadeem Akhtar, Navi Mumbai (IN); Ishank Tyagi, Meerut (IN); Kumaragouda K. Patil, Haveri (IN); Parag Mittal, Pune (IN); Karan Gupta, Pune (IN)

( * ) Notice: Subject to any disclaimer, the term of this patent is extended or adjusted under 35 U.S.C. 154(b) by 500 days.

(21) Appl. No.: 17/824,783

(22) Filed: May 25, 2022

(65) Prior Publication Data

US 2023/0388826 A1 Nov. 30, 2023

(51) Int. Cl.
*H04W 24/08* (2009.01)
*H04W 72/541* (2023.01)
*H04W 88/08* (2009.01)

(52) U.S. Cl.
CPC ......... *H04W 24/08* (2013.01); *H04W 72/541* (2023.01); *H04W 88/08* (2013.01)

(58) Field of Classification Search
CPC ... H04W 24/08; H04W 72/541; H04W 88/08; H04W 84/12
See application file for complete search history.

(56) References Cited

U.S. PATENT DOCUMENTS

| | | | |
|---|---|---|---|
| 8,305,971 B2* | 11/2012 | Gutkin | H04W 72/541 455/450 |
| 8,902,829 B2* | 12/2014 | Stephens | H04W 16/14 370/252 |
| 11,271,629 B1* | 3/2022 | Um | H04W 24/08 |
| 12,093,104 B1* | 9/2024 | Eastep | G06F 9/4881 |
| 2006/0217137 A1* | 9/2006 | Kushalnagar | H04B 17/345 455/501 |
| 2008/0220786 A1* | 9/2008 | Beacham | H04W 72/542 455/450 |
| 2017/0026845 A1* | 1/2017 | Garg | H04W 16/10 |
| 2021/0099889 A1* | 4/2021 | Johnson | H04W 16/14 |
| 2021/0143883 A1* | 5/2021 | Yerramalli | H04B 7/0626 |
| 2021/0160709 A1* | 5/2021 | Marumo | H04W 24/02 |
| 2023/0388826 A1* | 11/2023 | Akhtar | H04W 84/12 |

* cited by examiner

*Primary Examiner* — Charles C Jiang
*Assistant Examiner* — Rachel Elizabeth Marks
(74) *Attorney, Agent, or Firm* — Treyz Law Group, P.C.; Tianyi He (57) ABSTRACT

A networking system may include one or more wireless access points. A wireless access point may monitor, on a channel in a radio-frequency band, for activity of an interference source over a time period. The wireless access point may maintain historical activity information of the interference source for the channel based at least in part on the activity of the interference source over the time period. The wireless access point may perform a channel selection operation based at least in part on the maintained historical activity information of the interference source for the channel.

20 Claims, 9 Drawing Sheets

$$H_{channel,\,avg}(k) = \alpha * H_{channel,\,current} + (1-\alpha) * H_{channel,\,avg}(k-1)$$

ACCESS POINT CHANNEL SELECTION

BACKGROUND

This relates to wireless networks, and more particularly, to one or more wireless access points in wireless networks.

A network can include one or more wireless access points (APs) that wirelessly connect to one or more client devices. Using these wireless connections, the client devices can connect to the network through the access points. Access points and client devices can communicate wirelessly in different radio-frequency bands, or more specifically, on one or more radio-frequency channels in the radio-frequency bands (e.g., based on Wi-Fi protocols).

However, issues may arise when access points operate on some of these radio-frequency channels. In particular, if there are non-Wi-Fi transmitters or other sources of interference (e.g., RADAR sources, microwave links, satellite-based communication links, etc.) actively operating on the same operating radio-frequency channel as one of the access points, the access point can be forced to leave the radio-frequency channel and switch to operating on a different radio-frequency channel. This switching of radio-frequency channels leads to an undesired disruption of wireless connections between the access point and connected client devices. On the other hand, it would also be undesirable to entirely avoid radio-frequency channels susceptible to non-Wi-Fi interference given their prevalence in some radio-frequency bands.

It is within this context that the embodiments described herein arise.

DETAILED DESCRIPTION

A computer network can include network equipment forming a variety of network elements that interconnect end hosts of the network. Network element can include switches, bridges, routers, hubs, repeaters, firewalls, devices serving other networking functions, and devices that include the functionality of two or more of these devices. End hosts of the network can include computers, servers, network service devices, and any other suitable types of specialized or general-purpose host equipment, each serving client-side and/or server-side functionalities.

Figure 1:
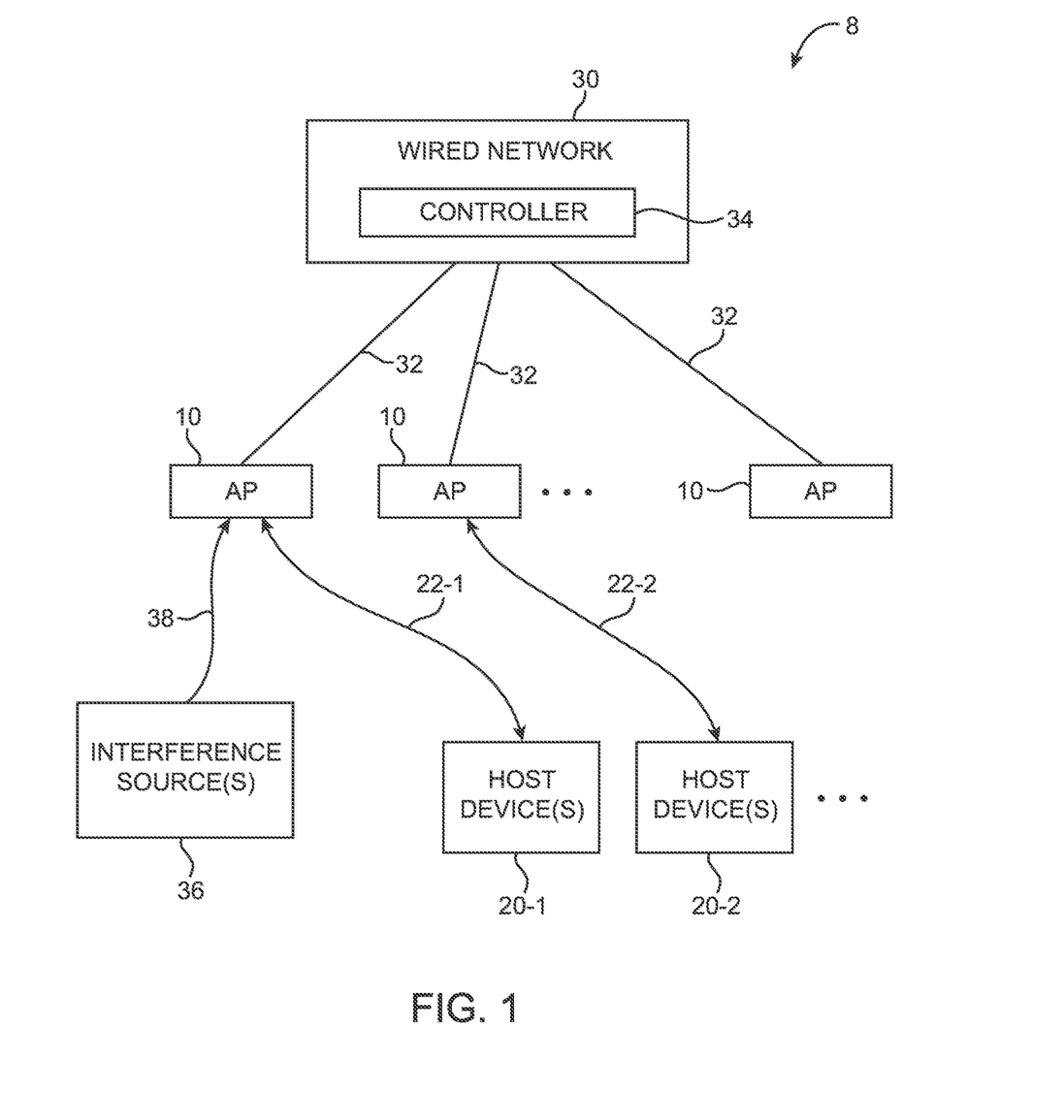
FIG. 1 is a block diagram of an illustrative network that includes access points wirelessly connected to client devices in accordance with some embodiments.

To support wireless connectivity to the network, the network can include one or more access points that connect host devices such as client devices to other portions of the network such as a wired portion of the network. FIG. 1 is a diagram of an illustrative network such as network 8 containing one or more wireless access points such as access points 10. In general, any suitable number of access points may exist at one or more geographical locations to extend the wireless connectivity (coverage) supported by network 8.

Each access point 10 may wirelessly connect to one or more host devices 20 such as client devices (e.g., desktop computers, laptop computers, smartphones, and/or other Wi-Fi-enabled devices) through corresponding wireless communication links 22. Through access point 10, a connected host device 20 can connect to network 8. Network 8 may include any suitable number and/or types of network elements, at least some of which are connected by one or more wired technologies or standards such as Ethernet (e.g., using copper cables and/or fiber optic cables), thereby forming wired network portion 30.

In particular, wireless communication links 22 may be based on IEEE 802.11 standards and Wi-Fi protocols for implementing wireless local area network (WLAN) communications. Data communicated between a pair of access point 10 and host device 20 through a corresponding wireless link 22 may be further conveyed to and from other parts of network 8 (e.g., network portion 30) using a corresponding wired path 32 such as an Ethernet connection.

If desired, network 8 may include a wireless access point controller (sometimes referred to as a wireless controller) such as controller 34. Controller 34 may provide centralized control to one or more access points 10 (e.g., through wired paths 32). In particular, controller 34 may provide configuration information or other data to one or more access points 10 to control the operational settings of each coupled access point 10.

Figure 2:
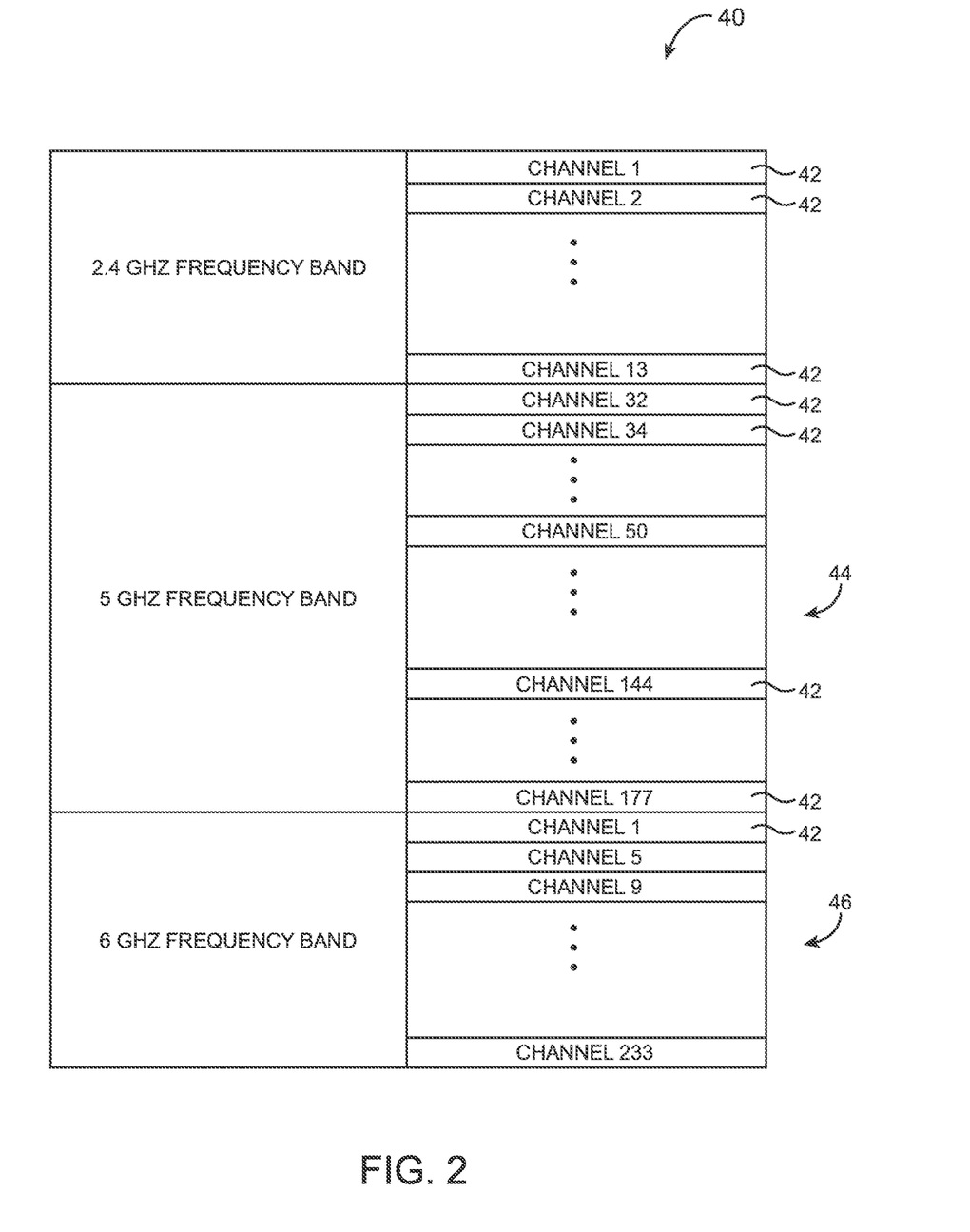
FIG. 2 is a table of illustrative radio-frequency bands based on wireless network protocols, some of which can include radio-frequency channels susceptible to interference, in accordance with some embodiments.

Sets of access points 10 may be deployed in different geographical locations across network 8. In some scenarios described herein as an illustrative example, a set of access points 10 (sometimes referred to herein as neighboring access points 10) may be located near one another (e.g., within the same floor of a building, within the same building, within different building in the same campus, etc.) and consequently may be susceptible to interference from one or more of the same interference sources 36 near the geographical location of the set of neighboring access points 10. In particular, activity of one or more interference sources 36 in proximity to these access points 10 may undesirably affect the operation of these access points 10. To illustrate this effect, FIG. 2 shows a table 40 of illustrative radio-frequency bands based on which access points 10 may operate (e.g., based on the IEEE 802.11 standards). More specifically, each radio-frequency band includes a corresponding set of channels 42 on which access points 10 can operate (when communicating on that radio-frequency band with host devices 20).

In the example of FIG. 2, an access point 10 may operate on a selected channel in channels 1-13 of the 2.4 GHz radio-frequency band (e.g., as specified by the IEEE 802.11b, g, n, and/or ax standards), a selected channel in channels 32, 34, . . . , 177 in the 5 GHz radio-frequency band (e.g., as specified by the IEEE 802.11a, h, j, n, ac, and/or ax standards), and/or a selected channel in channels 1, 5, 9, . . . , 233 in the 6 GHz radio-frequency band (e.g., as specified by the IEEE 802.11ax standard). Operation on some of these channels may be susceptible to external non-WLAN interference (e.g., non-Wi-Fi interference) because non-WLAN transmitters operating on the same radio-frequency channels may sometimes be active in the operating radio-frequency environment of access point 10. Accordingly, detection of an active source of interference (e.g., reception of an interference source activity signal 38 in FIG. 1) on the operating channel of access point 10 may warrant switching to a different radio-frequency channel.

As a first example, portion 44 of channels 42 in the 5 GHz radio-frequency band such as channels 50, 52, 54, . . . , 144 may be designated as Dynamic Frequency Selection (DFS) channels. Accordingly, these channels are susceptible to interference from RADAR (radio detection and ranging) sources. Illustrative sources of RADAR (e.g., interference source 36) may include airports, naval fields, weather stations, etc. When operating on one or more of these DFS channels, access point 10 may be mandated (e.g., by governmental or other regulations, by wireless communications standards, etc.) to switch to a different radio-frequency channel in response to detecting RADAR activity (e.g., receiving RADAR signals 38 in FIG. 1) on the operating DFS channel.

As a second example, some or all channels (e.g., channels 46) in the 6 GHz radio-frequency band may be susceptible to interference from microwave links and/or sources associated with satellite-based communication. When operating on one or more of these channels, it may be desirable (e.g., due to signal degradation from interference, due to governmental or other regulations, due to wireless communications standards) to switch radio-frequency channels in response to detection (e.g., reception of) microwave links and/or signals associated with satellite-based communication sources on the operating channel.

These two examples of radio-frequency bands and/or channels affected by non-Wi-Fi interference are merely illustrative. In other scenarios (e.g., when access points operate in radio-frequency channels that are affected by other types of non-WLAN interference, in other radio-frequency channels, in different channels specified by different governmental regulations or wireless communications standards, etc.), similar issues as mentioned above (e.g., signal degradation, channel switching, etc.) may arise.

Further, interference activity such as RADAR activity may not be easily predictable, thereby leading to the two undesirable operations of either avoiding these vulnerable radio-frequency channels altogether or operating on these channels while having access point connections be disrupted in response to detecting the interference activity. Particularly in the example of DFS channels, avoiding these channels may be sub-optimal or inefficient given the large number of (then-unused) DFS channels in the 5 GHz radio-frequency band.

To mitigate these issues relating to interference activity on these vulnerable radio-frequency channels, access points 10 (and/or other network elements such as controller 34, separate radio-frequency sensors, etc.) can gather interference activity data and maintain historical interference activity information, which can then be used to inform operating channel selection. This approach allows these theoretically interference-prone channels to be practically ranked based on real-world data (e.g., historical occurrence of interference activity on these channels), thereby leading access points 10 to preferentially use the interference-susceptible channels least likely (as indicated by historical information) to experience interference activity while leading access points 10 to preferentially avoid the interference-susceptible channels most likely (as indicated by historical information) to experience interference activity (as an example). Details relating to the gathering of interference activity data, the maintaining of historical interference activity information, channel ranking, channel selection, and other related operations are described below.

Figure 3A:
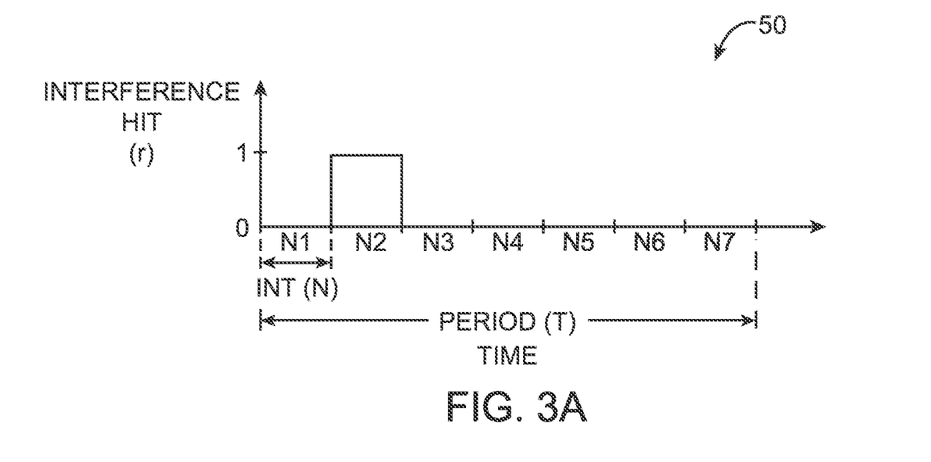
FIGS. 3A-3C are graphs of illustrative sets of interference activity data collected from different access points in accordance with some embodiments.
Figure 3B:
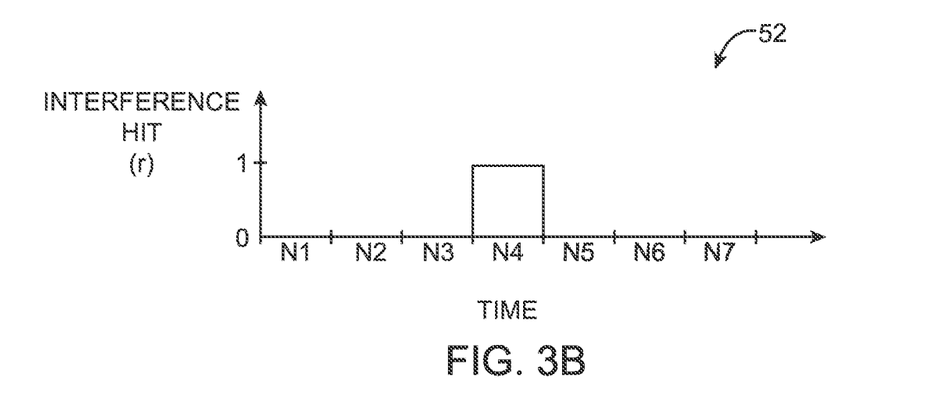
Figure 3C:
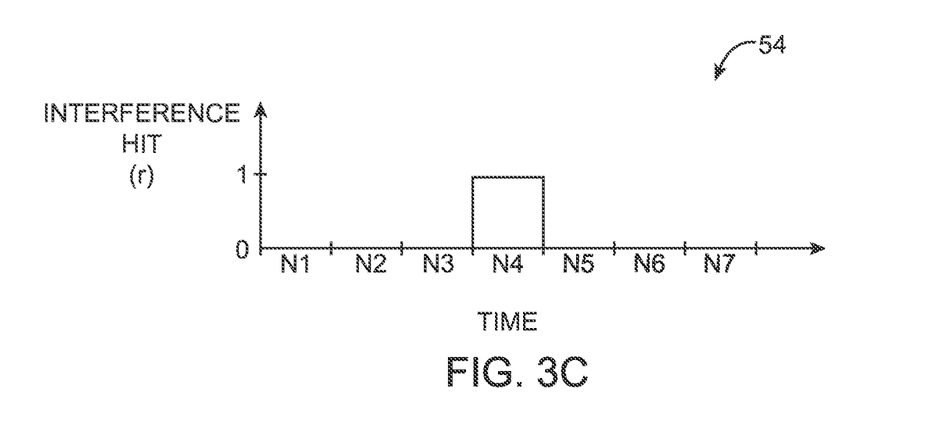

FIGS. 3A-3C show illustrative graphs relating to the type of raw interference activity data collected or gathered by access points 10 (or if desired by dedicated sensor circuitry) in network 8. In particular, in the example of FIG. 3A, graph 50 illustrates how a given access point 10 may gather interference activity data across a time period T. Time period T contains a number of smaller (e.g., equal-duration) time sub-intervals (or sub-periods) N. In the example of FIG. 3A, time period T is shown to include seven sub-intervals N1-N7. This is merely illustrative. If desired, each time period T may include any suitable number of sub-intervals of any suitable duration. As examples, the duration of time period T may be on the order of seconds, minutes, hours, or even longer time periods, and may be sub-divided into greater than 10 sub-intervals, greater than 50 sub-intervals, greater than 100 sub-intervals, etc.

During time period T, access point 10 may operate on a radio-frequency channel and may continuously monitor the radio-frequency environment for interference activity on the radio-frequency channel. Access point 10 may collect raw interference hit data such as a binary interference hit value at the sub-interval-level. As an example, if no interference activity on the radio-frequency channel is detected for the entire duration of a sub-interval N such as during sub-interval N1, the interference hit value (r) may have a value of '0' for the sub-interval (see, e.g., sub-intervals N1 and N3-N7 in FIG. 3A). If any interference activity on the radio-frequency is detected at one or more times during a sub-interval N such as during sub-interval N2, the interference hit value (r) may have a value of '1' for the sub-interval (see, e.g., sub-interval N2 in FIG. 3A).

Depending on the type of interference to be detected, access point 10 may determine whether an interference hit (e.g., interference activity) has occurred on its operating channel based on different types of signals scanned on its operating channel. In other words, access point 10 may continually (e.g., in some scenarios where continual scanning is necessitated by regulation such as for RADAR activity on an operating DFS channel), or if desired using a suitable periodicity, scan for signals on its operating channel indicative of interference signals from non-Wi-Fi transmitters. In the case of RADAR activity, the interference signals indicative of RADAR activity may have specific signal signatures or patterns (e.g., signals having a pre-determined range of signal strengths, a pre-determined sequence of signal pulses, pre-determined durations, etc.). In the case of other types of interference activity (e.g., associated with microwave links and/or satellite-based communication), access point 10 or other systems in the network may obtain interference source information and/or signal information (e.g., channel unavailability or conditional availability information, source geographical location information, signal frequency information, signal power level information, etc.) to identify these types of interference activity from external systems such as an Automated Frequency Coordination (service provider) system. In general, access point 10 may store, generate, or otherwise obtain the interference source information and/or interference signal information for comparison with received signals.

In other words, to determine an interference hit (e.g., indicative of an interference hit value of '1'), access point 10 may scan for receive (non-WLAN or non-Wi-Fi transmitter) signals on its operating channel. In response to receiving any non-Wi-Fi transmitter signals, access point 10 may compare the received signals to signal signatures or patterns associated with interference sources on the operating channel or other interference source and/or signal characteristics. In response to a match, access point 10 may record an interference hit value of '1' for that sub-interval (e.g., as shown for sub-interval N2 in FIG. 3A). Additionally, in response to the match, access point 10 may also take other actions (e.g., proceed with a channel switching process). Absent a match or any received signals associated with non-Wi-Fi transmitters, access point 10 may record an interference hit value of '0' for that sub-interval (e.g., as shown for sub-intervals N1 and N3-N7 in FIG. 3A).

A network such as network 8 (FIG. 1) may include a set of neighboring access points 10 deployed at similar geographical locations (e.g., within the same floor of a building, within the same building, within different building in the same campus, etc.). In these scenarios, some of the neighboring access points in the set of neighboring access points may operate on the same radio-frequency channel and may therefore scan the same operating channel for interference activity (hit) data in the same manner as described above in connection with FIG. 3A.

As an example, second and third access points 10-2 and 10-3 neighboring the first access point (10-1) described in connection with FIG. 3A may operate on the same operating radio-frequency channel as access point 10-1. Neighboring access points 10-2 and 10-3 may therefore obtain raw interference hit data for the same operating radio-frequency channel and over the same time period (e.g., during the same time period T). In particular, graph 52 of FIG. 3B illustrates how neighboring access point 10-2 may gather interference activity data such as raw interference hit data across time period T for the same operating radio-frequency channel. Similarly, graph 54 of FIG. 3C illustrates how neighboring access point 10-3 may gather interference activity data such as raw interference hit data across time period T for the same operating radio-frequency channel. In the illustrative examples of FIGS. 3B and 3C, neighboring access points 10-2 and 10-3 may both detect interference activity only during sub-interval N4 (having an interference hit value of '1') and not during sub-intervals N1-N3 and N5-N7.

Figure 4:
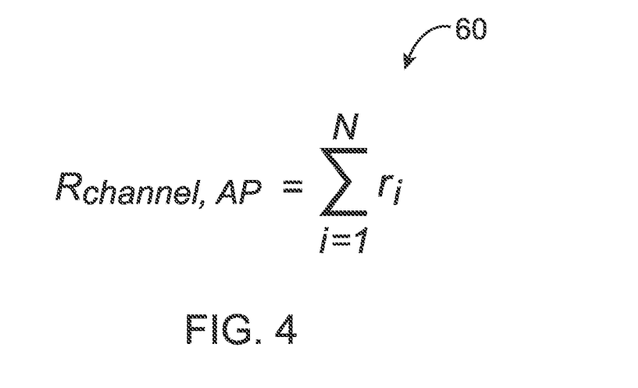
FIGS. 4-6 are illustrative mathematical formulas for processing radio-frequency channel interference activity data in accordance with some embodiments.
Figure 5:
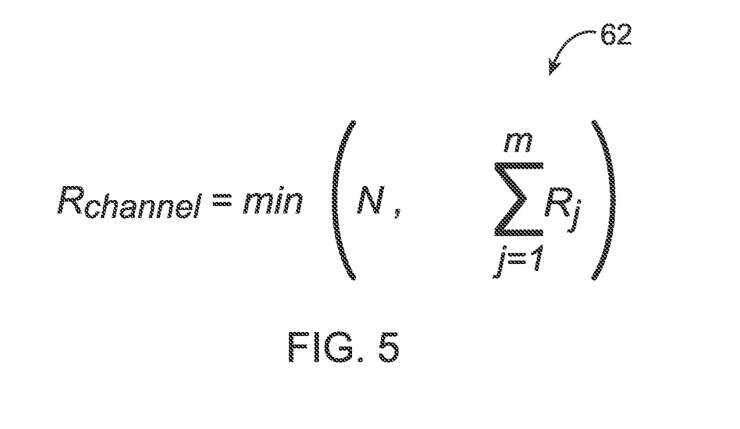
Figure 6:
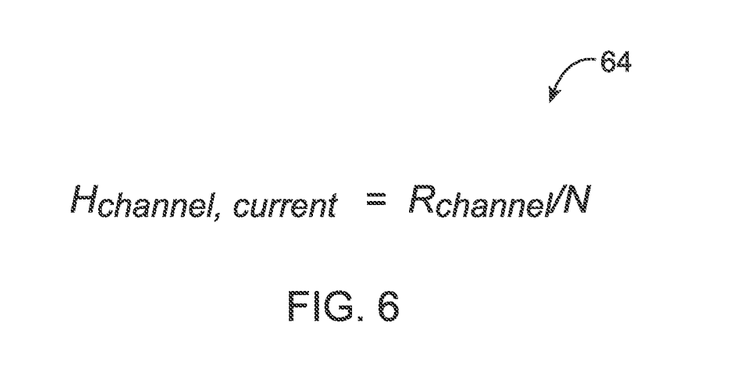

In a similar manner as described in connection with FIGS. 3A-3C, subsets of neighboring access points 10 operating on different radio-frequency channels may gather raw interference hit data for their respective operating radio-frequency channels. The gathered raw data may be shared with one another of the access points e.g., by using centralized controller 34 to pass along or aggregate the data. The gathered raw interference data may further be processed at one or more access points and/or at controller 34 to further generate a metric indicative of likelihood of interference activity associated with each operating radio-frequency channel. FIGS. 4-6 are illustrative mathematic formulas that may be used to generate one or more illustrative (intermediate) metrics useable to characterize likelihood of interference activity.

First, one or more access points 10 (e.g., each access point 10) may use formula 60 of FIG. 4 to generate a per-channel, per-access-point hit count value $R_{channel,\ AP}$ using the raw interference hit value gathered for a given time period T. Hit count value $R_{channel,\ AP}$ may be a sum of interference hit values r for each sub-interval in the entire time period T (as described in connection with FIGS. 3A-3C). In particular, value 'N' in formula 60 is the total number of sub-intervals in the entire time period T.

In the example of FIG. 3A, interference hit value $r_1$ for sub-interval N1 has a value of 0, interference hit value $r_2$ for sub-interval N2 has a value of 1, and interference hit values $r_3$ to $r_7$ for sub-intervals N3-N7 each have a value of 0. Accordingly, the interference hit count value for time period T associated with the operating channel of the access point 10-1 ($R_{channel,\ 10\text{-}1}$) is 1 (e.g., 0+1+0+0+0+0+0=1). Based on the same type of calculation, the interference hit count value for time period T associated with the same operating channel of neighboring access point 10-2 in connection with FIG. 3B ($R_{channel,\ 10\text{-}2}$) is 1, and the interference hit count value for time period T associated with the same operating channel of neighboring access point 10-3 in connection with FIG. 3C ($R_{channel,\ 10\text{-}3}$) is 1.

While access points 10 are each described to generate a per-channel, per-access-point hit count value $R_{channel,\ AP}$ using the raw interference hit value gathered, this is merely illustrative. If desired, a centralized controller such as controller 34 may instead receive the raw interference hit value gathered by each access point 10 and generate each per-channel, per-access-point hit count value $R_{channel,\ AP}$ using the raw interference hit value gathered and based on formula 60 of FIG. 4.

In scenarios where multiple neighboring access points (e.g., neighboring access points 10-1, 10-2, and 10-3) operate on the same radio-frequency channel and generate multiple per-channel, per-access-point hit count value $R_{channel,\ AP}$ for the same time period, one or more of these access points 10 (e.g., each of these access points 10) may further aggregate (e.g., sum) hit count values $R_{channel,\ AP}$ generated by each of its neighboring access points for the same time period based on formula 62 in FIG. 5 to generate an aggregated hit count value $R_{channel}$ for the operating channel. If desired, hit count values may be shared between neighboring access points via controller 34 or via other means.

In particular, hit count value $R_{channel}$ for the operating channel may be a sum of interference hit count values $R_{channel,\ AP}$ for each neighboring access point across the same time period, while being capped at a maximum value of N (i.e., the number of sub-intervals in time period T). In the example of FIGS. 3A-3C, the interference hit count value (for time period T, for the operating channel, and for the access point 10-1) $R_{channel,\ 10\text{-}1}$ is 1, the interference hit count value (for time period T, for the same operating channel, and for access point 10-2) $R_{channel,\ 10\text{-}2}$ is 1, and the interference hit count value (for time period T, for the same operating channel, and for access point 10-3) $R_{channel,\ 10\text{-}3}$ is 1. The sum of these interference hit count values for the operating channel is 3 (e.g., 1+1+1=3). Since this value of 3 is less than the number of sub-intervals N (e.g., 7 in this example), the aggregated channel hit count value $R_{channel}$ is also 3. In scenarios where the sum of the count values from multiple access points is greater than N, the aggregated hit count value $R_{channel}$ is set to N (e.g., a value of 7 in this example).

While access points 10 are each described to separately generate an aggregated hit count value $R_{channel}$ using hit count values received from other neighboring access points operating on the same radio-frequency channel (across the same time period), this is merely illustrative. If desired, a centralized controller such as controller 34 may instead receive per-access-point hit count values and/or raw interference hit value from each access point 10 and generate aggregated hit count values $R_{channel}$ for each radio-frequency channel based on formula 62 of FIG. 5.

Furthermore, one or more access points 10 (e.g., each access point 10) may further generate an interference hit rate value for the most-current time period and for the operating radio-frequency channel ($H_{channel, current}$) by dividing the aggregated hit count value $R_{channel}$ by the number of sub-intervals N in time period T (e.g., based on formula 64 in FIG. 6). In the example of FIGS. 3A-3C, the generated interference hit rate value (for the most receive time period T and the operating radio-frequency channel) $H_{channel, current}$ is around 0.4286 (e.g., 3 divided by 7).

While access points 10 are each described to separately generate an interference hit rate value for the most-current time period and for the operating radio-frequency channel, this is merely illustrative. If desired, a centralized controller such as controller 34 may instead receive aggregated hit count values, per-access-point hit count values, and/or raw interference hit value from each access point 10 and generate interference hit rate value for the most-current time period for each radio-frequency channel based on formula 64 of FIG. 6.

Access points 10 and/or centralized controller 34 may generate a corresponding time-period-specific $H_{channel}$ for each time period T based on formula 64 of FIG. 6. If desired, each of these interference hit rate values generated for each radio-frequency channel and for each time period T may be used as historical interference activity information with which access point channel selection is performed. However, it may be desirable to reduce the number of stored values while maintaining some memory of interference activity during past periods when characterizing historical occurrence of interference activity. As such, the interference hit rate values for each channel may be aggregated or combined across multiple time periods T to arrive in a single value that characterizes historical occurrence of interference activity on that channel. As examples, the aggregation of interference hit rate values across multiple time periods T may use an average of the interference hit rate values such as a moving average of the interference hit rate values across a rolling window of a fixed number of time periods T, an exponential moving average of the interference hit rate values, etc., a median of the interference hit rate values such as a moving median of the interference hit rate values across a rolling window of a fixed number of time periods T, or any other desired aggregation operation.

Figure 7:
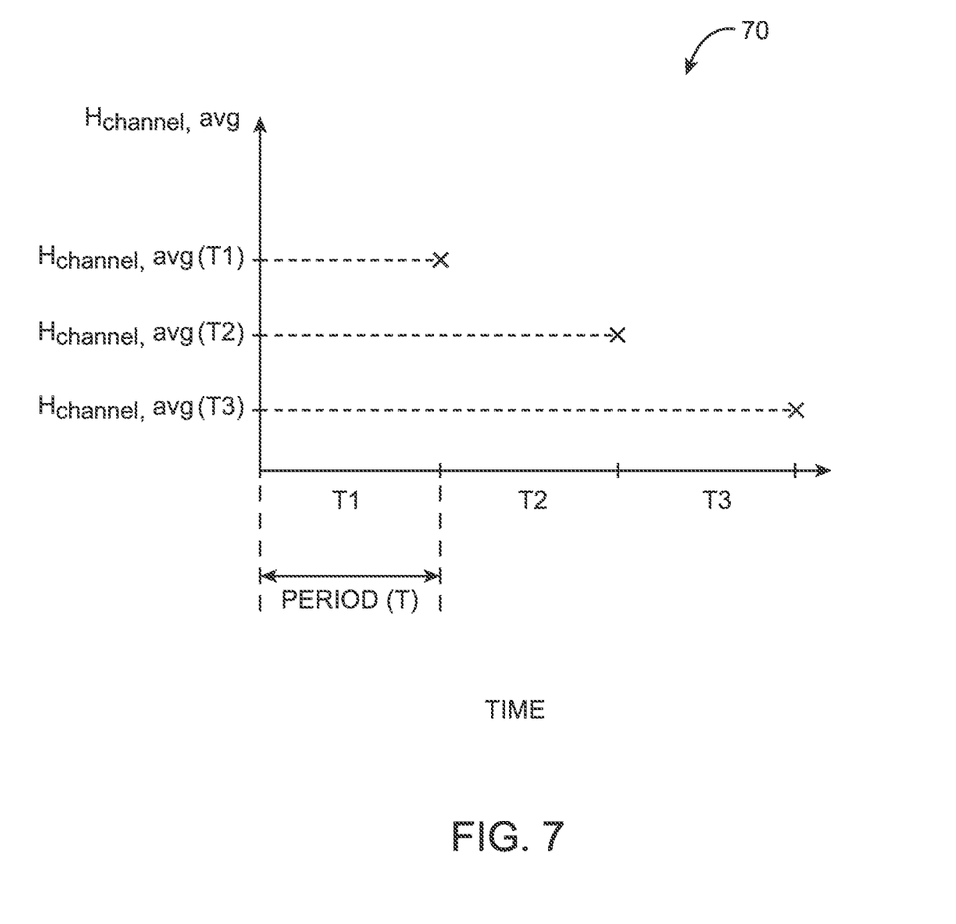
FIG. 7 is a graph of an illustrative set of average interference activity hit rates across multiple time periods for a given radio-frequency channel in accordance with some embodiments.

As shown in the example of FIG. 7, graph 70 illustrates how one or more access points 10 and/or controller 34 may each calculate and maintain an average hit rate value for an operating radio-frequency channel (e.g., value $H_{channel, avg}$) after each time period T. Each average hit rate value (e.g., calculated after at least two time periods) may have a first component associated with a period-specific hit rate value determined for the most recent time period and a second component associated with one or more hit rate values determined for one or more corresponding time periods before the most recent time period.

In particular, in the example of FIG. 7, after a first time period T1, one or more access points 10 and/or centralized controller 34 may calculate and maintain a first average hit value $H_{channel, avg}$(T1). In scenarios where no relevant interference activity information has been gathered prior to time period T1, the first average hit value may be equal to the period-specific hit rate value determined for time period T1 (e.g., $H_{channel, avg}$(T1) has no component associated with hit rates for time periods before T1).

After second time period T2, one or more access points 10 and/or centralized controller 34 may calculate and maintain a second average hit value $H_{channel, avg}$(T2). The second average hit value may have a first component associated with a period-specific hit rate value determined for time period T2 (e.g., value $H_{channel, current}$ for time period T2) and may have a second component associated with one or more hit rate values determined for one or more time periods prior to time period T2 (e.g., value $H_{channel, current}$ for time period T1). In such a manner, historical information prior to time period T2 as well as the most current information during time period T2 may be maintained in a single value $H_{channel, avg}$(T2).

After third time period T3, one or more access points 10 and/or centralized controller 34 may calculate and maintain a third average hit value $H_{channel, avg}$(T3). The third average hit value may have a first component associated with a period-specific hit rate value determined for time period T3 (e.g., value $H_{channel, current}$ for time period T3) and may have a second component associated with one or more hit rate values determined for one or more time periods prior to time period T3 (e.g., value $H_{channel, current}$ for time period T2 and/or value $H_{channel, current}$ for time period T1 depending on the type of historical averaging used). In such a manner, historical information prior to time period T3 as well as the most current information during time period T3 may be maintained in a single value $H_{channel, avg}$(T3).

In general, access points 10 and/or centralized controller 34 may employ any type of moving average (e.g., simple moving average, exponential moving average, etc.) or even moving median over any number of (current and prior) time periods T to generate aggregated hit rate values $H_{channel, avg}$ after each time period. In one configuration (as an example), one or more access points 10 and/or centralized controller 34 may utilize illustrative exponential moving average formula 80 in FIG. 8 to generate average hit rate values $H_{channel, avg}$.

Figure 8:
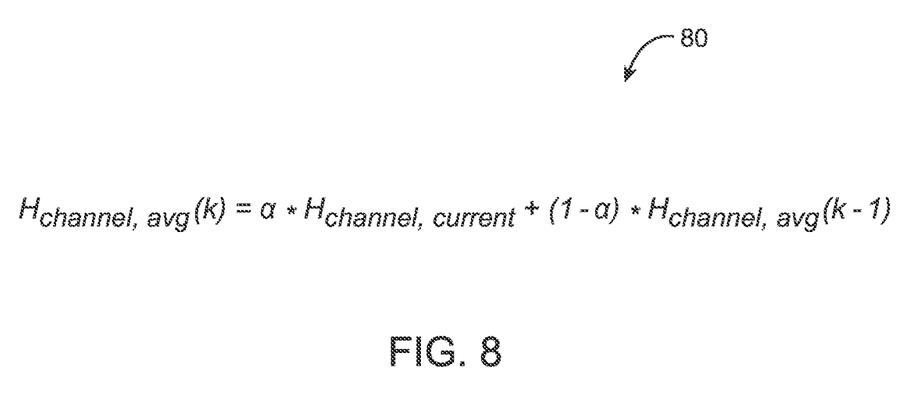
FIG. 8 is an illustrative mathematical formula for maintaining historical interference activity information in accordance with some embodiments.

As shown in FIG. 8, the average hit rate value $H_{channel, avg}$(k) for a given time period k may be equal to the sum of the most current period-specific hit rate value $H_{channel, current}$ weighed by a memory factor, $\alpha$, and the average hit rate value $H_{channel, avg}$(k−1) for the previous time period (k−1) weighed by (1−$\alpha$). The memory factor may be any suitable value and may be adjusted to adjust the emphasis or de-emphasis of the most recent historical hit rate information (relative to the more distant historical hit rate information).

Different sets of neighboring access points may operate on different radio-frequency channels. Accordingly, a first sub-set of neighboring access points operating on the same radio-frequency channel may collect interference activity data for generating average hit rate values $H_{channel, avg}$ for a first operating channel, a second sub-set of neighboring access points operating on the same radio-frequency channel may collect interference activity data for generating average hit rate values $H_{channel, avg}$ for a second operating channel, etc.

In one illustrative arrangement, different sub-sets of access points 10 may generate and share average hit rate values $H_{channel, avg}$ for different operating channels with one another (e.g., or with controller 34, which can then distribute the shared information between access points 10). In another suitable arrangement, controller 34 may centrally generate average hit rate values $H_{channel,\ avg}$ for different operating channels (e.g., based on data provided from each access point 10) and distribute these generated values to each access point 10. In either of these arrangements, the set of neighboring access points 10 may each store average hit rate values $H_{channel,\ avg}$ for each interference-susceptible radio-frequency channel (e.g., whether or not a given access point has operated on that radio-frequency channel). In such a manner, access points 10 may store historical interference activity information for each interference-susceptible radio-frequency channel.

Figure 9:
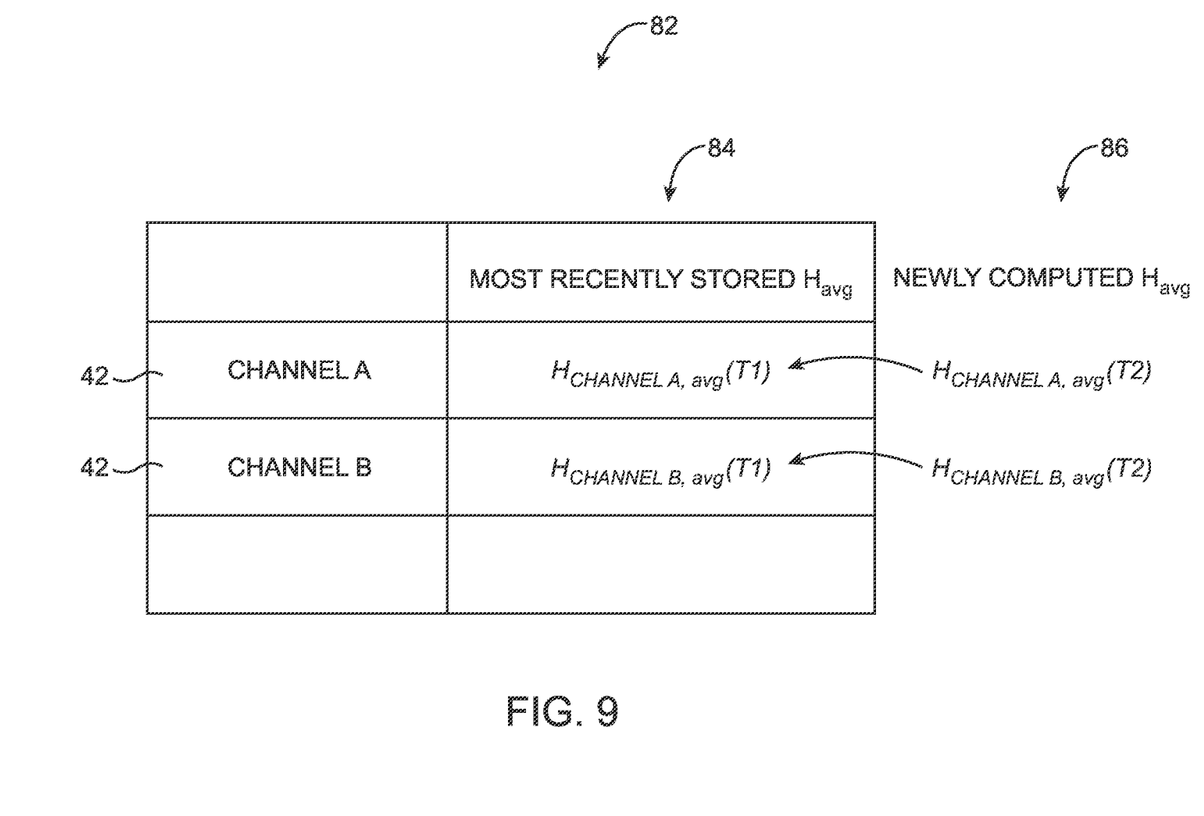
FIG. 9 is a table of illustrative historical interference activity information stored for multiple radio-frequency channels in accordance with some embodiments.

FIG. 9 shows an illustrative table 82 of illustrative historical interference activity information for each radio-frequency channel (e.g., each radio-frequency channel susceptible to interference activity). Centralized controller 34 and/or access points 10 may each maintain the per-channel historical interference activity information (e.g., average hit rate information) as illustrated in table 82. As shown in FIG. 9, one or more access points 10 and/or controller 34 may maintain average interference hit rate $H_{CHANNEL\ A,\ avg}$ for channel A, may maintain average interference hit rate $H_{CHANNEL\ B,\ avg}$ for channel B, etc. In general, any suitable number of average interference hit rate values $H_{channel,\ avg}$ for a corresponding number of channels (e.g., belonging to any number of radio-frequency bands) may be maintained.

In the example of FIG. 9, one or more access points 10 and/or controller 34 may store a first set of average interference hit rate values as shown in column 84 (e.g., at a time after time period T1 and before time period T2 as described in connection with FIG. 7). After time period T2, one or more access points 10 and/or controller 34 may update or replace the stored first set of average interference hit rate values with an updated set of newly computed average interference hit rate values 86. This process may be performed periodically to keep historical interference activity information up-to-date and may involve the sharing of information across different access points operating on the same and/or different radio-frequency channels (e.g., using centralized controller 34).

In scenarios where no interference hit data is gathered by any access point 10 or interference hit data is otherwise unavailable for a given radio-frequency channel, the average hit rate values $H_{channel,\ avg}$ for the radio-frequency channel may slowly but eventually decay to zero (e.g., as dictated by the memory factor in the exponential moving average formula of FIG. 8).

To keep historical interference activity information available for updating and for channel ranking and selection, the average hit rate values $H_{channel,\ avg}$ for each radio-frequency channel may be retained across rebooting operations of access points 10 (e.g., across powering down and power up cycles).

In general, the average hit rate values $H_{channel,\ avg}$ may provide a comparable way to rank radio-frequency channels based on observed past occurrences of interference activity, which can be indicative of future occurrences of interference activity. To further enhance the predictive characteristics of the average hit rate values $H_{channel,\ avg}$, even for the same channel, access points 10 may calculate and maintain multiple time-period-specific values of $H_{channel,\ avg}$ (e.g., different $H_{channel,\ avg}$ values for Monday, Tuesday, etc., different $H_{channel,\ avg}$ values for different weeks, different $H_{channel,\ avg}$ values for different months, etc.). In other words, due to the possible cyclical nature of interference activity, computing the multiple moving averages of the hit rates using only hit rate information on certain days (e.g., Mondays), weeks, or months (e.g., January), may more accurately characterize interference activity on the radio-frequency channel across different types of days. If desired, this cyclical nature of interference may be accounted for without needing to store multiple $H_{channel,\ avg}$ values for the same radio-frequency channel.

Figure 10:
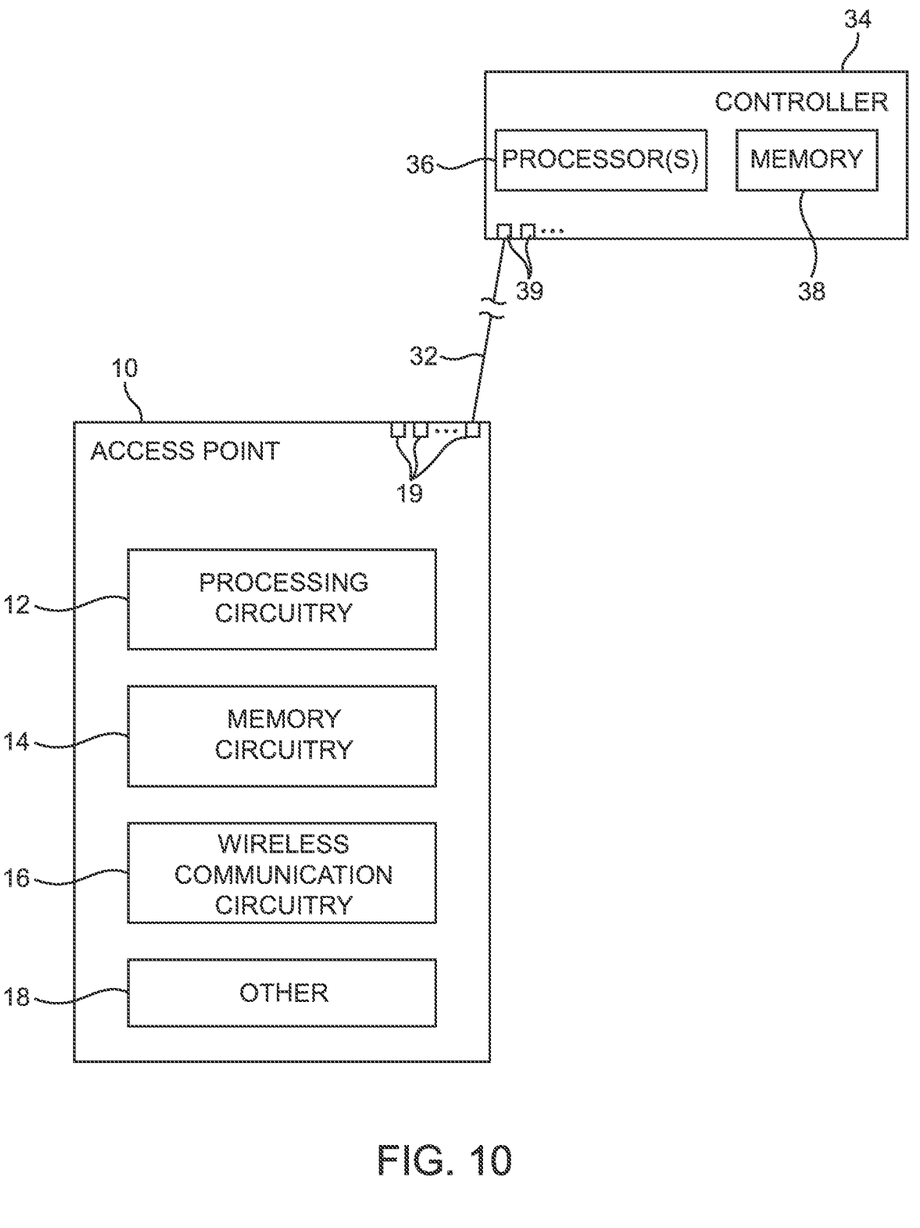
FIG. 10 is a functional block diagram of an illustrative access point coupled to an illustrative controller in accordance with some embodiments.

FIG. 10 is a diagram of illustrative configurations for access point 10 and controller 34. As shown in FIG. 10, access point 10 (one or more of the access points 10 in FIG. 1) may include processing circuitry 12, memory circuitry 14, wireless communications circuitry 16, and other components 18 such as input-output ports 19.

In particular, processing circuitry 12 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 14 may include volatile memory such as dynamic random-access memory, static random-access memory, etc., and non-volatile memory such as hard-drive storage, solid-state storage, flash memory, etc.

In general, the operations described herein relating to the operation of the access point 10 and/or other relevant operations may be stored as (software) instructions on one or more non-transitory computer-readable storage media (e.g., memory circuitry 14) in each access point 10. The corresponding processing circuitry (e.g., processing circuitry 12) in each access point for these one or more non-transitory computer-readable storage media may process the respective instructions to perform the corresponding access point operations. Processing circuitry 12 and memory circuitry 14, collectively, may sometimes be referred to herein as the control circuitry of access point 10 because the two are often collectively used to control one or more components of access point 10 to perform these operations (e.g., by sending and/or receiving requests, control signals, data, etc.).

To wirelessly communicate with host devices (e.g., client devices), access point 10 may include wireless communication circuitry 16. Wireless communication circuitry 16 may include one or more radios (e.g., Wi-Fi radios), radio-frequency transceiver circuitry, radio-frequency front-end circuitry, and one or more antennas. The one or more radios may use the one or more antennas to transmit radio-frequency signals to and receive radio-frequency signals from one or more host devices. As an example, each of access points 10 in network 8 (FIG. 1) may convey these radio-frequency signals at one or more Wi-Fi frequency bands, and more specifically at one or more radio-frequency channels in these frequency bands (e.g., frequency bands and channels as shown in FIG. 2). While wireless communication circuitry 16 is shown as a separate element from processing circuitry 12, this is merely illustrative. If desired, portions of wireless communication circuitry 16 (e.g., radio functionalities) may implemented on portions of processing circuitry 12.

Access point 10 may include other components 18 such as one or more input-output ports 19 such as Ethernet ports or other types of network interface ports that provided connections to other network elements (e.g., routers, modems, controllers) in the network, power ports through which power is supplied to access point 10, or other ports. If desired, other components 18 on access point 10 may include other input-output devices such as devices that provide output to a user such as a display device (e.g., one or more status lights) and/or devices that gather input from a user such as one or more buttons. If desired, other components 18 on access point 10 may include one or more sensors (e.g., radio-frequency sensors such as radio-frequency sensors antennas separate from those described in connection with wireless communications circuitry 16). Each component within access point 10 may be interconnected to one or other components (e.g., to the control circuitry in access point 10) via one or more paths (e.g., a data bus) that enable the reception and transmission of control signals and/or other data.

As shown in FIG. 10, controller 34 such as a centralized controller for controlling the operation of one or more wireless access points in the network may include processing circuitry 36, memory circuitry 38, and input-output ports 39.

In a similar manner as described above in connection with processing circuitry 12, memory circuitry 14, and input-output ports 19 in access point 10, the corresponding components in controller 34 may be configured in a similar manner. In particular, processing circuitry 36 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 38 may include volatile memory such as dynamic random-access memory, static random-access memory, etc., and non-volatile memory such as hard-drive storage, solid-state storage, flash memory, etc.

The operations described herein relating to the operation of the access point controller 34 and/or other relevant operations may be stored as (software) instructions on one or more non-transitory computer-readable storage media (e.g., memory circuitry 38) in access point controller 34. The processing circuitry (e.g., processing circuitry 36) in access point controller 34 for these one or more non-transitory computer-readable storage media may process the respective instructions to perform the corresponding access point controller operations. Processing circuitry 36 and memory circuitry 38, collectively, may sometimes be referred to herein as the control circuitry of access point controller 34 because the two are often collectively used to control one or more components of access point controller 34 to perform these operations (e.g., by sending and/or receiving requests, control signals, data, etc.).

Input-output ports 39 of controller 34 may include Ethernet ports or other types of network interface ports that provided connections to other network elements (e.g., routers, modems, controllers) in the network, power ports through which power is supplied to access point controller 34, or other ports. In the example of FIG. 10, port 39 of controller 34 is coupled to port 19 of access point 10, thereby forming an interconnecting path 32. Path 32 may enable controller 34 and access point 10 to convey control signals or other information (e.g., raw interference activity data, historical interference activity information, etc.) between them, thereby serving as a communication path. Path 32 may be a direct path (e.g., controller 34 is connected to access point 10 via no other intervening network nodes or elements) or an indirect path (e.g., controller 34 is connected to access point 10 via one or more intervening network nodes or elements). If desired, controller 34 may be wirelessly coupled to access point 10. Each access point 10 in network 8 (FIG. 1) may be coupled to and therefore communicate with centralized controller 34 using any of the above-mentioned means. If desired, access points 10 in network 8 may be coupled to multiple controllers 34 (e.g., different sets of access points 10 may be coupled to different controllers in a more distributed control scheme, access points 10 may be coupled to a redundant (back-up) controller, etc.).

Figure 11:
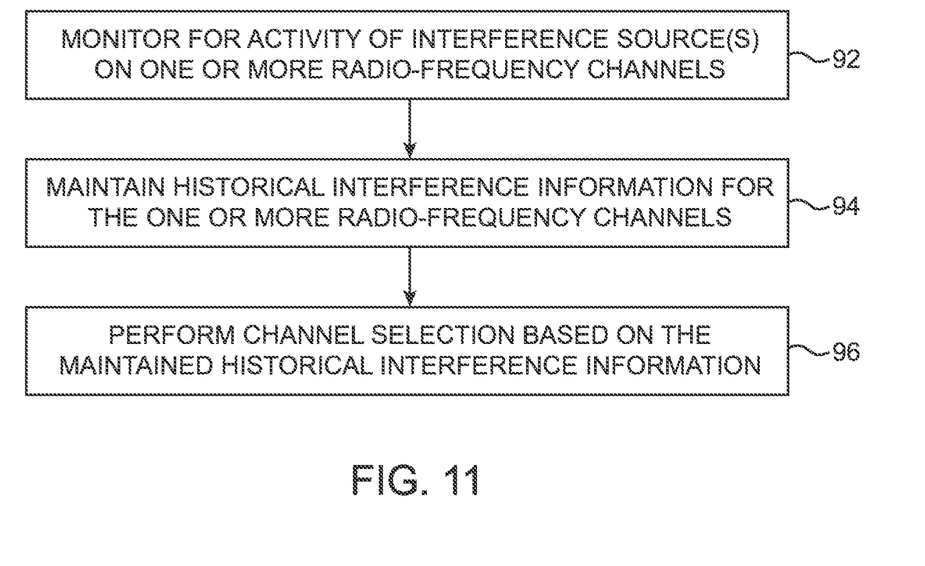
FIG. 11 is a flowchart of illustrative steps involved in performing channel selection based on historical interference activity information in accordance with some embodiments.

FIG. 11 is a flowchart of illustrative operations for performing channel ranking and selection based on historical interference activity information. The operations described in connection with FIG. 11 may be performed by one or more access points 10 and/or controller 34 in network 8. While some operations are primarily described as being performed at one or more access points, if desired, these operations may be performed at controller 34.

At operation 92, the control circuitry (e.g., processing circuitry 12 when processing instructions on memory circuitry 14) on an access point 10 may control wireless communication circuitry 16 (or if desired, separate radio-frequency sensor circuitry) to monitor for activity of one or more interference sources on a given radio-frequency channel (e.g., the operating radio-frequency channel of the access point 10). As an example, the given radio-frequency channel may be one of the channels described in connection with FIG. 2 to be susceptible to non-Wi-Fi interference (e.g., portion 44 of radio-frequency channels in the 5 GHz frequency band, portion 46 of radio-frequency channels in the 6 GHz frequency band, etc.).

Some access points 10 in the same geographical location (e.g., neighboring access points 10 in network 8) may operate on the same radio-frequency channel. These neighboring access points 10 may monitor for interference activity on the same radio-frequency channel. Other additional access points 10 in the same geographical location (e.g., neighboring access points 10 in network 8) may operate on one or more different radio-frequency channels. As such, these additional access points 10 may monitor for interference activity on one or more different radio-frequency channels. Collectively, the access points 10 in the same geographical location may monitor for interference activity on multiple radio-frequency channels.

In some illustrative configurations described herein as an example, the monitoring of interference activity on a given radio-frequency channel may include collecting interference hit data (e.g., a binary hit value, '1' or '0', for each sub-interval as described in connection with FIGS. 3A-3C). Collectively, multiple access points 10 may simultaneously collect interference hit data on multiple radio-frequency channels.

If desired, the monitoring of interference activity on different radio-frequency channels does not need to occur simultaneously. As an example, an access point 10 may first operate on a first radio-frequency channel and therefore monitor for interference activity on the first radio-frequency channel. In response to detected interference activity (e.g., RADAR activity) on the first radio-frequency channel, the access point 10 may switch to operating on a second radio-frequency channel and therefore then monitor for interference activity on the second radio-frequency channel.

At operation 94, processing circuitry 12 may control memory circuitry 14 on one or more access points 10 (and/or processing circuitry 36 may control memory circuitry 38 on controller 34) to store historical interference activity information generated based on the monitoring of interference activity performed at operation 92. Respective processing circuitry (on access point 10 and/or controller 34) may periodically update the stored historical interference activity information as new interference activity is gathered at operation 92. In such a manner, one or more access points 10 and controller 34 may maintain up-to-date historical interference activity information at its corresponding memory circuitry.

Historical interference activity information is channel-specific, or in other words, may generally be maintained in a per-channel manner (e.g., each set of historical interference activity information gathered on a particular radio-frequency channel is used to characterize interference activity on the particular radio-frequency channel). As examples, historical interference activity information for each radio-frequency channel may include interference hit value gathered for each sub-interval (N) on the radio-frequency channel (e.g., as shown in FIGS. 3A-3C), per-access-point hit count calculated for each time period (T) based on the gathered interference hit values for the corresponding sub-intervals (N) within that time period (T) (e.g., as calculated using the formula in FIG. 4), a collective hit count calculated for each time period (T) based on the gathered interference hit values for the corresponding sub-intervals (N) within that time period (T) and based on data from multiple access points (e.g., as calculated using the formula in FIG. 5), a channel hit rate calculated for each most recently completed (current) time period (T) (e.g., as calculated using the formula in FIG. 6), a channel average hit rate calculated for each most recently completed time period (T) (e.g., as calculated after each time period T such as after T1, T2, T3, etc. in FIG. 7, as calculated using the formula in FIG. 8, as updated after each time period T as shown in the table of FIG. 9).

In some illustrative arrangements, each access point 10 (e.g., at its corresponding memory circuitry) may store and update the channel average hit rate for each radio-frequency channel (susceptible to non-WLAN interference). Controller 34 may facilitate the sharing and updating of the channel average hit rate for different radio-frequency channels across access points 10. As an example, a first set of access points 10 may operate on a first radio-frequency channel and may therefore gather interference activity information for the first radio-frequency channel, while a second set of access points 10 may operate on a second radio-frequency channel and may therefore gather interference activity information for the second radio-frequency channel. In this example, controller 34 may receive interference activity information for the first radio-frequency channel from the first set of access points 10 and send the interference activity information for the first radio-frequency channel to the second set of access points 10. In a similar manner, controller 34 may share the interference activity information for the second radio-frequency channel with the first set of access points 10.

Each access points 10 may gather raw historical data such as interference hit values every sub-interval of a time period. The raw historical data is ultimately converted into processed historical interference activity data such as a channel average hit rate, which is stored and maintained at each access point 10 and/or at controller 34 (e.g., for distribution to access points 10 such as newly connected access points). The processing of raw historical data into processed historical interference activity data (e.g., conversion of channel interference hit values to a channel average hit rate using formulas in FIGS. 4-6 and 8) may occur at one or more access points 10 and/or controller 34 (using corresponding processing circuitry).

As one illustrative example, each access point 10 (e.g., processing circuitry 12) may perform its own processing based on the formula in FIG. 4 and convey the resulting channel hit count to controller 34. Controller 34 (e.g., processing circuitry 36) may gather the channel hit counts for the same and different channels from different access points 10, and process the received channel hit counts for each radio-frequency channel (e.g., aggregate any hit count information from multiple access points for the same channel based on the formula in FIG. 5, calculate the channel hit rate based on the formula in FIG. 6, calculate the channel average hit rate based on the formula in FIG. 8) to arrive at a channel average hit rate for each radio-frequency channel. Controller 34 may distribute the set of channel average hit rate values for the radio-frequency channels to all applicable access points (e.g., all neighboring access points 10 that share the same interference activity environment). If desired, any of the processing to arrive at the channel average hit rate may be performed at each access point 10 instead of at controller 34.

At operation 96, the control circuitry on one or more access points 10 may use the maintained historical interference activity information to perform radio-frequency channel selection and operate wireless communication circuitry 16 on the selected access point operating channel. In particular, each access point 10 may store a channel average hit rate for each radio-frequency channel susceptible to interference activity. Each channel average hit rate may be indicative of a degree of historical interference activity on that radio-frequency channel and therefore of the likelihood of future interference activity on that radio-frequency channel. Accordingly, the radio-frequency channels may be ranked based on the channel average hit rate, where a higher channel average hit rate is indicative of higher likelihood of interference activity when operating on the channel and a lower channel average hit rate is indicative of lower likelihood of interference activity when operating on the channel.

By performing channel ranking based on the channel average hit rate, access point 10 may utilize a criterion indicative of likelihood of interference activity in addition to other criteria (e.g., number of connected devices, signal strength, noise floor, load, etc.) to perform a channel selection operation. With the inclusion of this additional criterion, the channel selection operation may avoid one or more radio-frequency channels that are most likely to experience interference activity (e.g., RADAR activity for DFS channels), thereby minimizing connection disruptions due to channel switching after operating on the selected channel. Additionally, the channel selection operation may still select one or more radio-frequency channel susceptible to interference but are unlikely (based on historical interference activity information) to experience interference activity, thereby increasing the number of useable radio-frequency channels in the frequency band.

If desired, the control circuitry may determine a threshold level of channel average hit rate. The control circuitry may then compare the stored channel average hit rates with the threshold, and the radio-frequency channels having a channel average hit rate below the threshold level may be used, while those above the threshold level may be avoided. If desired, the control circuitry may preferentially select the lowest average hit rate channel (while considering the other criteria for channel selection).

If desired, access point 10 may perform channel selection (e.g., automatic channel selection, dynamic channel selection) during access point start-up and/or periodically during operation. During each instance of channel selection, access point 10 may use the maintained historical interference activity information to perform channel ranking and channel selection.

In general, access point(s) and/or wireless access point controller(s) may operate based on one or more of operations 92, 94, and 96 in a simultaneous and/or sequential manner, and may repeatedly operate based on one or more of operations 92, 94, and 96 with any desired periodicity.

In general, the operations described herein relating to the monitoring for interference activity, maintaining of historical interference activity information, performing channel selection, the included sub-operations, and any other associated operations may be stored as software instructions on one or more non-transitory computer-readable storage media associated with one or more access points 10 (e.g., memory circuitry 14 in access point 10), one or more access point controllers (e.g., memory circuitry 38 in controller 34), and/or other network devices in the network. The corresponding processing circuitry (e.g., processing circuitry 12 in access point 10, processing circuitry 36 in controller 34) associated with these one or more non-transitory computer-readable storage media may process the respective instructions to perform the corresponding operations.

The foregoing is merely illustrative of the principles of this invention and various modifications can be made by those skilled in the art without departing from the scope and spirit of the invention.

What is claimed is:

1. A method of operating a wireless access point, the method comprising:
    monitoring, on a channel in a radio-frequency band, for interference activity over first and second time periods while operating on the channel;
    gathering interference activity data for the channel at sub-intervals of the first and second time periods at least in part by determining, for each sub-interval in the sub-intervals of the first time period, an interference hit value indicative of the interference activity being present or absent;
    determining a first interference hit rate value by summing the interference hit values for the sub-intervals of the first time period;
    determining a second interference hit rate value based on additional interference hit values for the sub-intervals of the second time period;
    aggregating the first interference hit rate value and the second interference hit rate value to obtain an aggregate channel hit rate value;
    maintaining historical interference activity information for the channel by storing the aggregate channel hit rate value; and
    performing a channel selection operation based at least in part on the stored aggregate channel hit rate value.

2. The method defined in claim 1, wherein monitoring for the interference activity comprises receiving a signal sequence during a given sub-interval in the sub-intervals of the first time period and determining whether the received signal sequence corresponds to a signal sequence indicative of activity of an interference source.

3. The method defined in claim 2, wherein gathering the interference activity data comprises, in response to determining that the received signal sequence corresponds to the signal sequence indicative of the activity of the interference source, updating the interference hit value for the given sub-interval to be indicative of the interference activity being present and wherein
    the first interference hit rate value is determined based on a number of sub-intervals in the first time period.

4. The method defined in claim 1, wherein the second time period is after the first time period and wherein the aggregate channel hit rate value characterizes the interference activity on the channel over each sub-interval of multiple time periods, including the first and second time periods.

5. The method defined in claim 1, wherein the aggregate channel hit rate value is a moving average or a moving median of multiple interference hit rate values, including the first and second interference hit rate values.

6. The method defined in claim 1 further comprising:
    maintaining additional historical interference activity information for an additional channel in the radio-frequency band at least in part by receiving information indicative of interference activity data for the additional channel gathered by an additional wireless access point and by storing an additional aggregate channel hit rate value for the additional channel.

7. The method defined in claim 6, wherein the received information comprises the additional aggregate channel hit rate value for the additional channel.

8. The method defined in claim 1, wherein the radio-frequency band is a 5 GHz frequency band, and the channel is a dynamic frequency selection (DFS) channel, and the interference activity is associated with radio detection and ranging (RADAR) activity.

9. The method defined in claim 1, wherein the radio-frequency band is a 6 GHz frequency band, and the interference activity is associated with microwave link activity or satellite-based communication activity.

10. One or more non-transitory computer-readable storage media comprising computer-executable instructions that, when executed by one or more processors on a wireless access point, cause the one or more processors to:
    maintain, at memory circuitry of the wireless access point, historical radio detection and ranging (RADAR) activity information for a dynamic frequency selection (DFS) channel, wherein the maintained historical RADAR activity information is indicative of past activity of one or more RADAR sources on the DFS channel and comprises an average hit rate value for the DFS channel that is an average of at least a first hit rate value characterizing the past activity across a first time period and a second hit rate value characterizing the past activity across a second time period prior to the first time period; and
    perform a channel selection operation based at least in part on the average hit rate value for the DFS channel.

11. The one or more non-transitory computer-readable storage media defined in claim 10 further comprising computer-executed instructions that, when executed by the one or more processors, cause the one or more processors to:
    control wireless communication circuitry to operate on the DFS channel and to collect RADAR activity data on the DFS channel while operating on the DFS channel, wherein the average hit rate value for the DFS channel is determined based at least in part on the RADAR activity data collected on the DFS channel by the wireless communication circuitry.

12. The one or more non-transitory computer-readable storage media defined in claim 11, wherein the average hit rate value for the DFS channel is further determined based at least in part on RADAR activity data collected on the DFS channel by an additional network device.

13. The one or more non-transitory computer-readable storage media defined in claim 10 further comprising computer-executable instructions that, when executed by the one or more processors, cause the one or more processors to:
    maintain, at the memory circuitry, additional historical RADAR activity information for an additional DFS channel indicative of past activity of the one or more interference sources on the additional DFS channel, the maintained additional historical RADAR activity information comprising an additional average hit rate value for the additional DFS channel, wherein performing the channel selection operation is further based at least in part on the additional average hit rate value for the additional DFS channel.

14. The one or more non-transitory computer-readable storage media defined in claim 13, wherein the additional average hit rate value for the additional DES channel is received from an additional network device.

15. The one or more non-transitory computer-readable storage media defined in claim 10, wherein the average of at least the first hit rate value and the second hit rate value is an average of at least the first hit rate value weighed by a first factor and the second hit rate weighed by a second factor.

16. A wireless access point comprising:
wireless communication circuitry configured to operate on a radio-frequency channel and to monitor the radio-frequency channel for interference activity while operating on the radio-frequency channel; and
memory circuitry configured to store interference activity information indicative of a degree of historical interference activity on the radio-frequency channel and to update the stored interference activity information based at least in part on the radio-frequency channel being monitored by the wireless communications circuitry, wherein the stored interference activity information comprises a channel interference hit rate value for the radio-frequency channel determined based on interference hit values for sub-intervals of a given time period and based on additional interference hit values for the sub-intervals of the given time period, wherein the interference hit values are based on the radio-frequency channel being monitored for the interference activity by the wireless communication circuitry, and wherein the additional interference hit values are based on the radio-frequency channel being monitored for the interference activity by an additional wireless access point.

17. The wireless access point defined in claim 16, wherein the channel interference hit rate value characterizes the interference activity on the radio-frequency channel over each sub-interval of the given time periods as monitored by the wireless communication circuitry and by the additional wireless access point.

18. The wireless access point defined in claim 16 further comprising:
an input-output port configured to receive, from a controller, information associated with monitoring of the radio-frequency channel by the additional wireless access point.

19. The wireless access point defined in claim 16, wherein the memory circuitry is configured to store additional interference activity information indicative of a degree of historical interference activity on an additional radio-frequency channel on which the wireless communication circuitry is not operating.

20. The wireless access point defined in claim 19, wherein the memory circuitry is configured to update the stored additional interference activity information based at least in part on information on the additional radio-frequency channel received from external equipment.

* * * * *